(12) United States Patent
Danhauser

(10) Patent No.: US 7,744,319 B2
(45) Date of Patent: Jun. 29, 2010

(54) DESTRUCTION-FREE PRESS CONNECTION ON PYROMECHANICAL SECURING ELEMENTS

(75) Inventor: Franz Danhauser, Nuremberg (DE)

(73) Assignee: Delphi Technologies, Inc., Troy, MI (US)

( * ) Notice: Subject to any disclaimer, the term of this patent is extended or adjusted under 35 U.S.C. 154(b) by 567 days.

(21) Appl. No.: 10/586,515

(22) PCT Filed: Jan. 20, 2005

(86) PCT No.: PCT/EP2005/000525

§ 371 (c)(1),
(2), (4) Date: Jul. 18, 2006

(87) PCT Pub. No.: WO2005/071274

PCT Pub. Date: Aug. 4, 2005

(65) Prior Publication Data

US 2007/0183861 A1    Aug. 9, 2007

(30) Foreign Application Priority Data

Jan. 21, 2004    (DE) ....................... 10 2004 002 993

(51) Int. Cl.
*F16B 13/04* (2006.01)
(52) U.S. Cl. ........................................ 411/20
(58) Field of Classification Search ................ 411/20; 29/508, 517; 470/2, 48
See application file for complete search history.

(56) References Cited

U.S. PATENT DOCUMENTS

| | | | |
|---|---|---|---|
| 166,438 A | * | 8/1875 | Whitehouse .................. 72/476 |
| 1,382,906 A | | 6/1921 | Gravell ........................ 411/504 |
| 1,400,401 A | * | 12/1921 | Allan ............................ 411/20 |
| 1,823,158 A | * | 9/1931 | Spatta et al. ............. 301/124.1 |

(Continued)

FOREIGN PATENT DOCUMENTS

DE    971711 C    1/1938

(Continued)

*Primary Examiner*—Flemming Saether
(74) *Attorney, Agent, or Firm*—Thomas N. Twomey

(57) ABSTRACT

The invention relates to a pyromechanical securing element for the mechanical connection of two components. The securing element comprises a covering and a pyrotechnical propellant charge is arranged in the head part thereof, said propellant charge being adjacent to an adapter, and securing means or a stop for the first component are arranged on the rear part of the covering and a second component can be pushed onto the covering between the first component and the head part. The covering on the head part comprises expected fracture indents extending in the longitudinal direction which tear open the covering in the head area when the propellant charge is ignited and the first component is rigidly connected to the second component in order to allow the adapter to bend. The aim of the invention is to securely anchor the covering to the adapter without using extreme force. Said invention is characterized in that the groove is arranged in the adapter in such a manner that it at least sectionally surrounds the outer periphery thereof, and that a radially protruding collar is arranged on the outer surface of the cover before the cover is anchored to the adapter, and the groove disposed in the adapter is flush with the collar of the cover and at least one part of the collar is pressed into the groove in order to anchor the cover with the adapter.

8 Claims, 2 Drawing Sheets

U.S. PATENT DOCUMENTS

| | | | | |
|---|---|---|---|---|
| 2,030,169 | A | * | 2/1936 | Huck ............................ 411/34 |
| 2,378,118 | A | * | 6/1945 | Widrich ........................ 411/20 |
| 2,387,742 | A | | 10/1945 | Burrows ....................... 411/20 |
| 2,398,633 | A | | 4/1946 | Gazda .......................... 411/333 |
| 2,842,022 | A | | 7/1958 | Keine ............................ 411/20 |
| 2,852,843 | A | * | 9/1958 | Banta et al. .................... 29/517 |
| 3,152,392 | A | * | 10/1964 | Coppack ....................... 29/517 |
| 3,166,971 | A | | 1/1965 | Stoeker ........................ 411/20 |
| 3,332,311 | A | * | 7/1967 | Schulz .......................... 411/20 |
| 3,780,752 | A | * | 12/1973 | Noddin et al. ............ 137/68.13 |
| 4,909,686 | A | | 3/1990 | Bender ......................... 411/20 |
| 2003/0017029 | A1 | | 1/2003 | O'Banion .................... 411/501 |

FOREIGN PATENT DOCUMENTS

| | | |
|---|---|---|
| DE | 655669 C | 3/1959 |
| DE | 19754791 A1 | 6/1999 |
| DE | 10338394 A1 | 4/2004 |
| FR | 2713724 A1 | 6/1995 |

\* cited by examiner

DESTRUCTION-FREE PRESS CONNECTION ON PYROMECHANICAL SECURING ELEMENTS

TECHNICAL FIELD

The invention relates to a pyromechanical securing element according to the preamble of claim 1.

BACKGROUND OF THE INVENTION

Such a pyromechanical securing element is known from German Offenlegungsschrift 10 338 394, (which corresponds with US 2006/0110233 A1 to Brede, et al.) which was published after the priority date of this application.

This securing element consists of a metallic covering, in the head part of which a pyrotechnic propellant charge is arranged. This propellant charge borders on an adapter. A flanged edge for securing a first component is arranged on the rear part of the covering, bordering on the adapter. A second component can be pushed onto the covering between this first component and the head part so that the second component rests on the first component.

At its head part, the covering has theoretical break notches running in longitudinal direction, which tear open when igniting the propellant charge, so that the surfaces lying inbetween bend around the adapter and thus press the second component either directly or via a floating disc against the first component, as a result of which the first component is firmly connected to the second component.

SUMMARY OF THE INVENTION

The object of the invention is to improve a pyromechanical securing element according to the preamble of claim 1, so that the covering can be anchored by the adapter without extreme application of force.

This object is achieved according to the invention in that:
  in the adapter is arranged a groove rotating at least in sections on its outer periphery,
  in that before anchoring the covering with the adapter, a radially projecting collar is arranged on the outer surface of the covering,
  in that the groove in the adapter is aligned with the collar of the covering and
  in that at least one part of the collar is pressed into the groove to anchor the covering with the adapter.

Due to the arrangement of a groove in the adapter and the collar aligned therewith on the outer surface of the covering, when pressing at least a part of the collar into the groove, extreme application of force is not required to anchor the covering with the adapter.

In a preferred embodiment, the groove in the adapter and the collar of the covering are designed to be rotating on the particular outer periphery.

The outer surface of the covering has an at least 3-surface shape after pressing in according to the invention. The covering preferably has a square shape after pressing in. A square shape of the covering and hence of the securing element is particularly advantageous for installation.

The corners, for example of the square shape of the covering, are advantageously bevelled. This beveling is effected by pressing the covering into the groove at these points.

In one embodiment of the invention, the covering is produced from metal and the adapter is preferably designed to be cylindrical. The adapter is usually produced from metal, but may also consist of a strong plastic.

The groove in the adapter is advantageously arranged centrally with respect to its longitudinal extension.

The invention is illustrated in more detail below using an exemplary embodiment.

DESCRIPTION OF THE PREFERRED EMBODIMENT OF THE INVENTION

Figure 1:
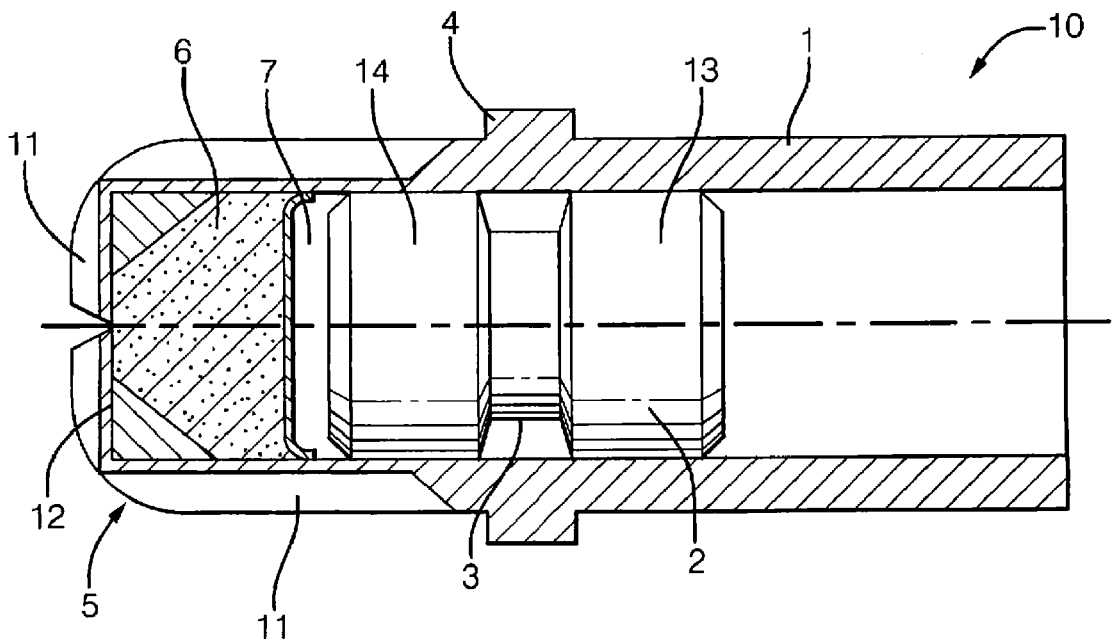
FIG. 1, is a cross-sectional view taken along the longitudinal axis of a securing element embodying the preferred embodiment of the present invention prior to affixation of the adapter to the covering.

FIG. 1 shows in a longitudinal section, the covering 1 of a pyromechanical securing element in which an adapter 2. The adapter 2 is designed to be cylindrical in this embodiment and preferably consists of metal, like the covering 1. A propellant charge 6, which can be ignited, for example by a laser beam, is arranged in the head part 5 of the covering 1.

So that the propellant charge 6 or the resulting gases, after ignition thereof, tear open the covering 1 in the region of the head part 5 and it may bend around the adapter 2, theoretical break notches running in longitudinal direction are provided in the head part 5. These theoretical break points run radially on the end-face side of the head part 5.

A cavity 7 for pressure build-up is arranged between the propellant charge 6 and the adapter 2. When an adapter 2 bordering on the propellant charge 6 is mentioned, this also includes the introduction of a cavity 7 between the latter.

An annular groove 3 is arranged on the outer periphery of the adapter 2. The covering 1 has a collar 4 rotating on its outer periphery flush with this groove 3.

FIG. 1 shows the securing element before anchoring of the covering 1 with the adapter 2.

Figure 2:
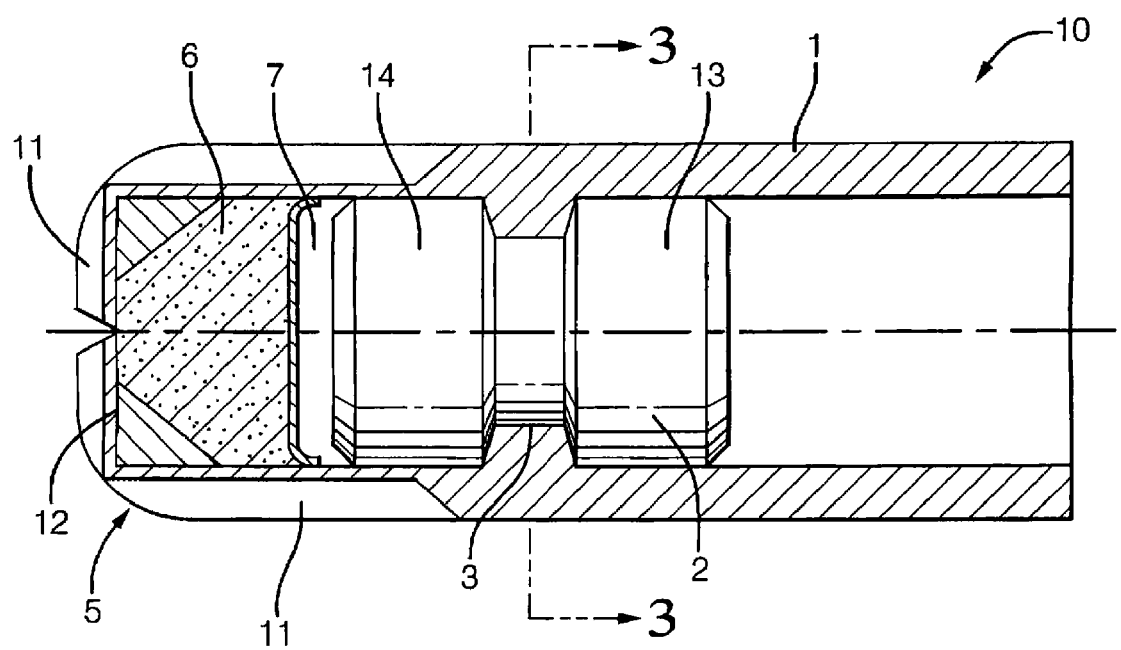
FIG. 2, is a cross-sectional view corresponding to that of FIG. 1 after fixation of the adapter to the covering.
Figures 3, 4:
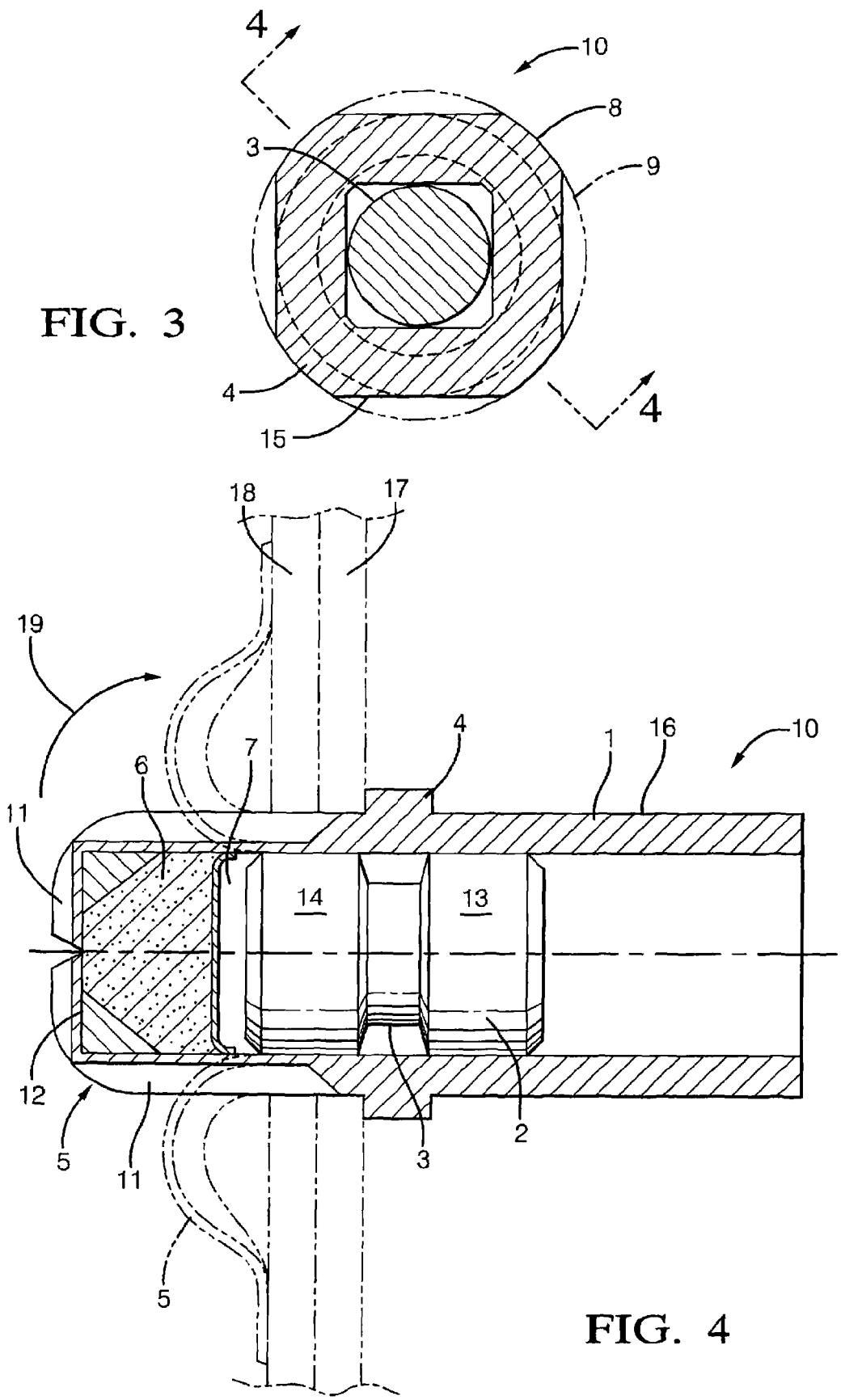
FIG. 3, is a cross-sectional view taken along lines 3-3 of FIG. 2.
FIG. 4, is a cross-sectional view taken along lines 4-4 of FIG. 3.

FIGS. 2 and 3 show the securing element after anchoring, with FIG. 2 being in the same longitudinal section as FIG. 1. It can be seen clearly that the collar 4 in the state before anchoring (FIG. 1) has disappeared in the state after anchoring (FIG. 2) on the outer periphery of the covering 1. The material of the collar 4 has been pressed radially in the direction of groove 3 by a pressing process and is now situated (at least partly) in this groove 3, as a result of which in addition to the very robust mechanical anchoring of the covering 1 with the adapter 2, a square key shape of the securing element having beveled corners 8 and flats 15 is produced.

FIG. 3 illustrates the original outer peripheral surface of the collar 4 in phantom at 9.

FIGS. 1-3 do not show the securing means or a stop for a first component.

FIG. 4 illustrates the pyromechanical securing element 10 in an application similar in some respects to the device illustrated in U.S. 2006/0110233 A1 to Brede et al. referenced hereinabove. The covering 1 of the pyromechanical securing element 10 is positioned to extend leftwardly through registering concentric through passages in adjacent first and second components 17 and 18, respectively, until the leading stop surface of the beveled corners 8 of the collar 4 abut the first component 17. As illustrated, the head part 5 of the covering 1 extends leftwardly from the first and second components 17 and 18, and the rear part 16 of the covering 1 extends rightwardly through the apertures of the first and second components 17 and 18. As best seen in FIG. 3, the rear part 16 of the covering 1 includes the collar 4 which has been previously deformed into the circumferentially alternating beveled corners 8 and flats 15. The collar 4 comprises stop means radially disposed on the rear part 16 of the covering 1 which registers with the concentric through passages. Upon ignition of the propellant charge 6, the head part 5 frangibly separates into discrete elements along the radially and longitudinally extending theoretical break notches 11, which are rotatively deformed generally about the large diameter portion 14 of the adapter 2, as depicted by arrow 19, until forming a clamping engagement with the second component 18. As illustrated in phantom, the deformed discrete elements of the head part 5 cooperate with the stops formed by the beveled corners 8 to clampingly secure the first and second components 17 and 18 together.

The invention claimed is:

1. A pyromechanical securing element for mechanical connection of two components, said securing element comprising:
    a generally cylindrical covering, including an expandable head part;
    a pyrotechnic propellant charge disposed within said head part, which borders on an adapter; and
    a stop disposed on a rear part of the covering distal said head part for registering with concentric through passages in adjacent first and second components to be interconnected, wherein the covering, at its head part, has frangible break notches running in longitudinal direction operable to tear open the covering in the head region upon ignition of the propellant charge to bend separated head part portions around the adapter, as a result of which the first component is firmly connected to the second component, wherein
    the adapter defines a groove extending about the outer periphery thereof,
    the covering defines at least three radially projecting collar portions arranged on the outer surface of the covering and radially projecting collar portions arranged on an inner surface of the covering projecting into the adapter groove to anchor the covering with the adapter, and
    the radially projecting collar portions arranged on the outer surface are axially aligned and circumferentially alternating with the radially projecting collar portions arranged on the inner surface.

2. The securing element of claim 1, wherein the groove extends circumferentially about the adapter and the collar extends circumferentially about the covering.

3. The securing element of claim 1, wherein the covering has a square shape with beveled corners.

4. The securing element of claim 1, wherein the covering is formed from metal.

5. The securing element of claim 1, wherein the adapter is substantially cylindrical.

6. A pyromechanical securing element for mechanical interconnection of two components, said securing element comprising:
    a generally cylindrical covering which is substantially closed at one end thereof to define an expandable head portion;
    a generally cylindrical adapter disposed within said covering, said adapter defining first and second axially spaced large diameter portions and an intermediate reduced diameter portion; and
    a pyrotechnic propellant charge disposed in said head portion intermediate said closed end and said adapter,
    wherein said covering defines radially projecting collar portions arranged on the outer surface of the covering and radially projecting collar portions arranged on an inner surface of the covering projecting inwardly toward the reduced diameter portion of said adapter to effect fixed engagement therebetween, and
    wherein said radially projecting collar portions arranged on the outer surface include a plurality of flat surfaces, and the radially projecting collar portions arranged on the outer surface are axially aligned and circumferentially alternating with the radially projecting collar portions on the inner surface.

7. The securing element according to claim 6, further comprising notches formed in said head part to effect predetermined expansion thereof upon combustion of said propellant charge.

8. The securing element according to claim 6, further comprising an axial spacing intermediate said adapter and said propellant charge.

* * * * *